United States Patent [19]
Jones

[11] Patent Number: 5,500,681
[45] Date of Patent: Mar. 19, 1996

[54] APPARATUS AND METHOD FOR GENERATING PRODUCT COUPONS IN RESPONSE TO TELEVISED OFFERS

[76] Inventor: Charles P. Jones, 3278 Jamul Highlands Rd., Jamul, Calif. 91935

[21] Appl. No.: 248,484

[22] Filed: May 24, 1994

[51] Int. Cl.$^6$ ............................................. H04N 7/08
[52] U.S. Cl. .................. 348/473; 348/12; 455/2
[58] Field of Search .......................... 348/1, 2, 3, 5, 348/6, 12, 14, 465, 473; 455/2, 4.2, 6.3; 364/407, 405; H04N 9/00, 7/00

[56] References Cited

U.S. PATENT DOCUMENTS

| | | | |
|---|---|---|---|
| 4,745,468 | 5/1988 | Von Kohorn | 358/84 |
| 4,857,999 | 8/1989 | Welsh | 358/84 |
| 4,876,592 | 10/1989 | Von Kohorn | 358/84 |
| 4,910,672 | 3/1990 | Off et al. | 364/405 |
| 4,926,255 | 5/1990 | Von Kohorn | 358/84 |
| 5,034,807 | 7/1991 | Von Kohorn | 358/84 |
| 5,057,915 | 10/1991 | Von Kohorn | 358/84 |
| 5,070,404 | 12/1991 | Bullock et al. | 358/142 |
| 5,128,752 | 7/1992 | Von Kohorn | 358/84 |
| 5,227,874 | 7/1993 | Von Kohorn | 358/84 |
| 5,249,044 | 9/1993 | Von Kohorn | 358/86 |
| 5,285,278 | 2/1994 | Holman | 348/3 |
| 5,287,181 | 2/1994 | Holman | 348/473 |

FOREIGN PATENT DOCUMENTS 3635768  10/1986  Germany ................. G06K 7/10

*Primary Examiner*—Victor R. Kostak
*Assistant Examiner*—Glenton B. Burgess
*Attorney, Agent, or Firm*—Brown, Martin, Haller & McClain

[57] ABSTRACT

Coupon information is stored in a memory at a cable television station. The cable television station may simultaneously transmit multiple video signals, each representing different sources of television programming, over multiple television channels on the cable network. The video signal may at times, such as during a product advertisement or other offer, include an embedded coupon identifier. A coupon subsystem at the cable television station monitors each video signal and retrieves token information from a database when it detects a corresponding embedded token identifier. The coupon information is transmitted over a data channel on the cable network. A subscriber unit at the television viewer's site receives the data channel and extracts the coupon information. The television programming aurally or visually alerts the viewer that a coupon may be generated. If the viewer actuates an input device, such as a button on a television remote control, a printer generates a coupon bearing the coupon information.

21 Claims, 2 Drawing Sheets

APPARATUS AND METHOD FOR GENERATING PRODUCT COUPONS IN RESPONSE TO TELEVISED OFFERS

BACKGROUND OF THE INVENTION

The present invention relates to an apparatus and method for generating a token, such as a product coupon or ticket, at a television viewer's site in response to a request by the television viewer.

Businesses may offer consumers coupons. Coupons are typically printed on paper and made available to consumers in various ways, including placing them in product containers and printing them in newspapers and magazines. A consumer may redeem the coupon at an establishment to obtain a cash discount for goods or services purchased there. If the establishment is a retailer of manufactured goods, the retailer, in turn, redeems the coupons by sending them to the manufacturer, who then reimburses the retailer for the amount of the discount. A retailer may utilize a redemption agency as a liaison between it and the manufacturer. A redemption agency sorts and tallies the coupons, validates the coupons as a safeguard against fraud and misredemption, determines the charges to the manufacturer, and compiles statistical information that may be useful to the manufacturer. Coupons, once redeemed, are destroyed to prevent re-use.

Manufacturers and other businesses have long advertised their products and services to consumers using the medium of television. Television commercials may be transmitted over cable networks and broadcast over the air. Coupons may be available for the advertised products and services.

A method for distributing coupons using signals transmitted via television channels is described in U.S. Pat. Nos. 5,249,044 and 5,128,752, both issued to Von Kohorn. The Von Kohorn system transmits a video image of product information, such as the manufacturer's name, the amount of the discount, and an identification number. The product information is displayed on a consumer's television. The consumer views this information on the television and then manually enters it into a hand-held electronic device using a keypad. The device has a printer that can be activated to print a coupon having some or all of the entered product information on it.

Coupons are valuable because they can be exchanged for cash, and fraud and misredemption are costly to manufacturers and retailers. Above all other considerations, a coupon distribution system should prevent duplication of a coupon. The Von Kohorn system, however, allows a user to print multiple copies of a coupon by entering the same product information multiple times. Another feature of the Von Kohorn system allows the electronic device to record the coupon transmission while the consumer is away from the television. Not only does recording a coupon encourage unlimited duplication, but it also fails to encourage the consumer to watch the televised commercial.

It would be desirable to provide a system that distributes product coupons to consumers' sites using signals transmitted via television channels, while safeguarding against fraud and misredemption and while encouraging the consumers to watch the televised advertisements for the products. These problems and deficiencies are clearly felt in the art and are solved by the present invention in the manner described below.

SUMMARY OF THE INVENTION

The present invention is a system for generating a token such as a product coupon or a ticket that is offered to a television viewer through a televised offer, such as a product advertisement. For example, an advertisement may notify the television viewer that a coupon is available for a product. The viewer can print a coupon by entering a suitable response on an input device, such as a television remote control unit. The viewer can only generate a token within a predetermined time period or window and can only do so once during the time period corresponding to a discrete televised offer. The possibility of unauthorized token duplication and resulting fraud are thus minimized.

The token generator may produce tokens having any suitable form, such as a printed paper slip, where the token is a product coupon or a ticket, or a passive magnetic card or a "smart card."

The video signal representing the televised offer has embedded in it a token identifier. The token identifier may, for example, be embedded in a blanked line in the same manner as closed-captioning information. The token identifier is used as an index to retrieve the information for generating the token. This token information is either transmitted to the viewer's site over a digital data communication channel or pre-stored in a memory at the user's site. The token information may include a bit-mapped image of the token.

In an exemplary embodiment, the token information is stored in a database memory at a cable television station. The cable television station may simultaneously transmit multiple video signals, each representing different sources of television programming, over multiple television channels on the cable network. The video signal may, at times such as during a product advertisement or other offer, include an embedded token identifier. A coupon subsystem at the cable television station monitors each video signal and retrieves token information from the database memory when it detects a corresponding embedded token identifier. The token information is immediately transmitted over a data channel on the cable network and repeatedly transmitted for a predetermined time period or coupon availability window. (Data channels are commonly used in the art for transmitting digital data representing stock market quotations, weather forecasts and other information over the same cable that carries television channels.) The television programming aurally or visually alerts the viewer that a token, such as a product coupon, may be generated. A subscriber unit at the television viewer's site receives both the television channels and the data channel. If the viewer actuates an input device, such as a button on a television remote control, the subscriber unit searches the token information it receives on the data channel for the token information corresponding to the token identifier it receives on the television channel that the viewer is watching. The subscriber unit then generates a token bearing the token information. The subscriber unit will only respond to the viewer's request to generate a token if the request occurs within the availability window because that is the only time during which the token information is transmitted on the data channel.

Although in the exemplary embodiment the communication channels over which the video signals and token information are transmitted are those of a cable television network, the communication channels may be those of any medium having sufficient bandwidth to carry the information described herein. In addition to conductive cables, suitable media may include optical fiber networks, radio, satellite and terrestrial microwave networks, and networks including combinations of several media. Furthermore, although in the exemplary embodiment the video signal is transmitted in an analog format and the token information is transmitted in digital format, the communication channels described herein may use any suitable analog or digital format, including those in accordance with the analog or digital television standards of the United States or other countries.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
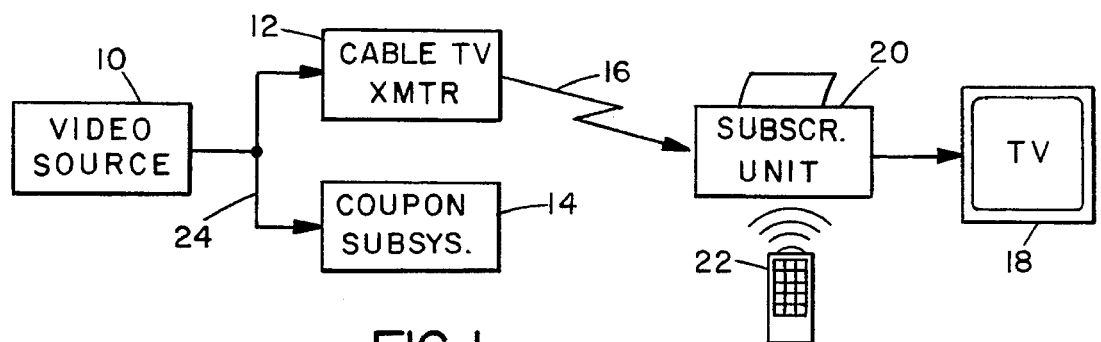
FIG. 1 is a diagrammatic view of a system for generating product coupons at a television viewer's site in response to a cable television transmission.

As illustrated in FIG. 1, a video source 10, transmitter 12 and a coupon subsystem 14 are located at a cable television station or head end of a cable television distribution network 16. A television 18 and a subscriber unit 20 are located at a television viewer's site, which may be a residence. The television viewer may provide commands to subscriber unit 20 using a remote control 22.

Video source 10, which may be a videotape player, a satellite feed, studio camera or other device, produces a video signal 24. Video signal 24 is representative of typical television programming such as entertainment, news and advertising. Transmitter 12 modulates video signal 24 in any suitable manner commonly used in television systems and transmits the resulting signal over a television channel or freqency band of distribution network 16. (Although a typical cable television system has multiple channels to enable multiple video signals from multiple sources to be transmitted simultaneously, only a single video source 10 and channel are shown in FIG. 1 for purposes of clarity.) Subscriber unit 20 receives the transmitted signal and provides it to television 18, which displays the corresponding programming imagery for viewing by a television viewer (not shown). If television 18 is not capable of directly tuning all television channels transmitted over distribution network 16, i.e., television 18 is not of the so-called "cable-ready" type, subscriber unit 20 may convert the received signal to a frequency tunable by television 18 in any suitable manner commonly used in cable television systems.

Advertising programming may offer a coupon for the product advertised. Advertisers may embed a coupon identifier, which is described below in further detail, in the video signals of their advertising programming using the method known in the art for providing closed-captioned text for the hearing-impaired. As known in the art, a closed-captioning decoder (not shown in FIG. 1) in either television 18 or subscriber unit 20 enables television 18 to display any closed-captioned text that may be embedded in video signal 24. The coupon identifier preferably includes closed-captioned text such as "COUPON AVAILABLE" to inform television viewers, particularly the hearing-impaired, that the advertiser is offering a coupon for the product. Alternatively or in addition, the advertising programming may have a spokesperson verbally inform the television viewer that a coupon is available.

The coupon identifier includes a control code that is not displayable as closed-captioned text and a coupon identification number. Coupon subsystem 14 monitors video signal 24 to detect closed-captioning. When coupon subsystem 14 detects a control code, it uses the coupon identification number as an index to retrieve a stored coupon packet from a memory. The coupon packet, which is described below in further detail, includes a field consisting of multiple bits that together correspond to a bit-mapped image of the coupon and a header consisting of multiple fields of binary words. The header includes a field consisting of the coupon identification number. Coupon subsystem 14 provides the coupon packet to transmitter 12, which transmits the coupon packet on a data channel of cable network 16, as described below in further detail. The coupon packet is repeatedly transmitted during a time period or availability window that extends at least to the completion of the transmission of the corresponding television programming, but preferably extends an additional five minutes.

In response to the advertisement, the television viewer may request that subscriber unit 20 print a coupon. The consumer may do this by pressing one or more buttons on subscriber unit 20 or on remote control unit 22. Subscriber unit 20 detects and decodes closed-captioning, as described below in further detail. When subscriber unit 20 detects a control code, it temporarily stores or queues the corresponding coupon identification number. If the television viewer requests that a coupon be printed, subscriber unit 20 retrieves or selects the queued coupon identification number.

Subscriber unit 20 monitors the data channel to detect coupon packets, as described below in further detail. If subscriber unit 20 has selected a coupon identification number in response to a television viewer's request to print a coupon, subscriber unit 20 searches for any packet that has a coupon identification number equal to the selected coupon identification number. If it finds the packet, subscriber unit 20 reads the coupon image bits of the packet, reconstructs the bit-mapped image, and prints the coupon. The television viewer can thus only generate a coupon during the coupon availability window.

Figure 2:
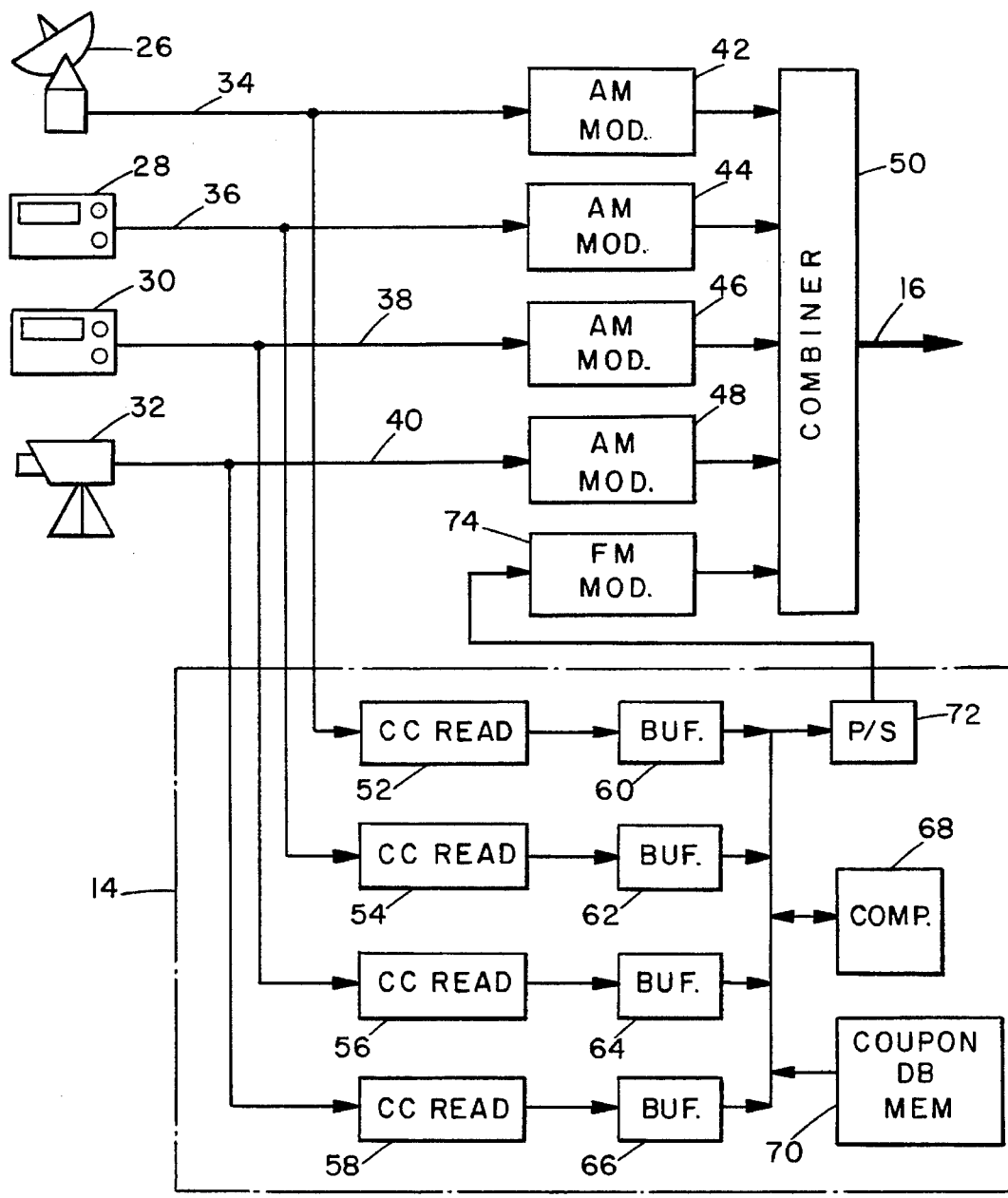
FIG. 2 is a diagrammatic view of the transmitting portion of the system at a cable television station.

FIG. 2 illustrates the portion of the present invention at the cable television station or head end in further detail. As noted above, video source 10 may be a satellite receiver 26, one of videotape players 28 and 30, or a studio camera 32, which produce video signals 34, 36, 38 and 40, respectively. Cable television transmitter 12 includes amplitude modulators 42, 44, 46 and 48 for modulating video signals 34–40, respectively, at different central carrier frequencies. The modulated signals thus define frequency bands or channels that are combined in a combiner 50 and transmitted to residences or other subscriber sites via cable distribution network 16. Cable television transmitter 12 may also include other devices, which are not shown in FIGS. 1 and 2 for purposes of clarity, but which are typically included in cable television systems.

Coupon subsystem 14 includes a plurality of closed-captioning readers 52, 54, 56 and 58 for reading the closed-captioned digital data encoded into video signals 34, 36, 38 and 40, respectively. A preferred closed-captioning method is described in the standard promulgated by the Federal Communications Commission, entitled "Television Synchronizing Waveform for Color Transmission," *FCC Rules and Regulations,* Part 73, Subpart E (1990). Commercially available closed-captioning decoders that operate in accordance with this FCC standard receive a video signal and extract the closed-captioning from line 21 of the vertical blanking interval as two seven-bit (plus one parity bit) ASCII words. FIFO buffers 60, 62, 64 and 66 receive such ASCII closed-captioning data from closed-captioning readers 52–58, respectively. Computer 68 monitors each of FIFO buffers 60–66 to determine whether it has received closed-captioning data. Computer 68 reads the data from any of FIFO buffers 60–66 that has stored closed-captioning data. Computer 68 includes associated program and data memory and is controlled by suitable software. Computer 68 must operate at sufficient speed to read FIFO buffers 60–66 at an average rate exceeding that at which they are likely to be filled.

A coupon identifier consists of a string of closed-captioning data. The first two words define a control code within the range between 10 (hex) and 1F (hex). Ordinary closed-captioning will not include words within this range because the characters to which these ASCII values correspond are unprintable. A closed-captioning decoder, whether it is in television 18 or in subscriber unit 20 will thus not display any characters on television 18 in response to the control code. The next 17 words define the ASCII character string "COUPON AVAILABLE." The next six words define the coupon identification number as an ASCII numeric character string. Computer 68 reads the data in buffers 60–66 and searches for the control code. Alternatively, or in addition, computer 68 may verify that it has found a coupon identifier by reading the next 17 words and comparing some or all of them to words defining the ASCII string "COUPON AVAILABLE." Computer 68 reads the six words defining the coupon identification number and converts them from ASCII characters to a single numeric value. Computer 68 uses this value to form an address or pointer. Computer 68 uses the pointer to read a coupon packet from a coupon database memory 70.

Coupon database memory 70, which may comprise one or more magnetic or optical disks, has stored in it coupon information. The coupon information is organized as multiple records, each indexed by one coupon identification number. Each record preferably includes the ASCII-encoded coupon identification number, an ASCII-encoded universal product code (UPC) number, a numeric coupon availability window in seconds, a 256-bit demographic information field, a numeric image length in bytes, and an image field having the number of bits specified by the image length. The image field defines a bit-mapped image of the coupon information such as the name of the advertised product, the amount of the discount, a graphical or pictorial representation of the product or the advertiser's logo, and any other information that the advertiser may wish to include.

The coupon information in coupon database memory 70 may be updated at any time and in any suitable manner. For example, computer 68 may also include a modem (not shown) for receiving new coupon information via the telephone lines from the auditing agency that acts as a representative for advertisers.

Computer 68 reads a record of coupon information from coupon database memory 70 and forms a coupon packet in its working memory (RAM). The coupon packet includes all of the coupon information in the record except for the transmission window length and also includes the date and time and a number identifying the cable television station. The coupon packet format consists of six fields of header data followed by one field of image data. The format of the coupon packet is shown below:

| BYTE POSITION | FIELD DESCRIPTION |
| --- | --- |
| bytes 1–6 | coupon identification number (ASCII) |
| bytes 7–16 | date and time (ASCII) |
| bytes 17–22 | cable company identification number (ASCII) |
| bytes 23–42 | universal product code (ASCII) |
| bytes 43–74 | demographic information bits |
| bytes 75–78 | image length |
| bytes 79– 79 + image length | image bits |

Computer 68 provides a copy of the coupon packet to a serial port 72. A frequency modulator 74 receives the coupon packet bits and modulates a central frequency that defines a data channel with the bits. The modulated signal is combined with other channels in combiner 50 and transmitted to subscriber sites via cable distribution network 16. Computer 68 may use any suitable synchronization methods commonly used in asynchronous data communication, such as preceding a coupon packet with one or more synchronization bytes.

Computer 68 may queue multiple coupon packets in its memory and provide them sucessively to serial port 72. Computer 68 monitors serial port 72 to determine when each preceding coupon packet has been transmitted and then provides the next coupon packet in the queue. Furthermore, computer 68 retains the coupon packet in its working memory and provides successive copies to serial port 72 during a period of time equal to the availability window and at intervals as frequent as the system speed allows, preferably no greater than every five seconds. It should be noted that computer 68 forms and transmits coupon packets corresponding to coupon identifiers embedded in any of video signals 34–40. Different packets are thus time-multiplexed on the data channel.

After the availability window has closed, computer 68 may erase the coupon packet from its working memory. Subscriber unit 20 thus may receive the coupon packet and print a coupon only during the availability window. The availability window is preferably at least as long as the televised advertisement itself, but should not exceed the length of the televised advertisement by more than five minutes. Such an availability window allows a television viewer sufficient time following the advertisement to determine whether he would like to obtain a coupon.

Figure 3:
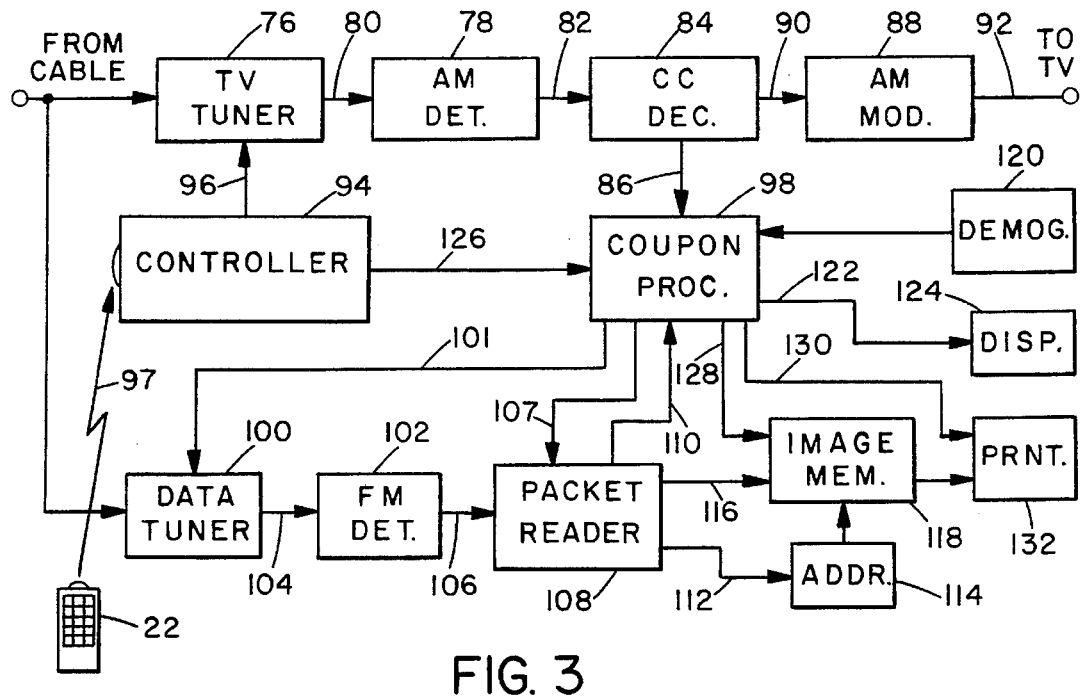
FIG. 3 is a diagrammatic view of the receiving portion of the system at the television viewer's site.

FIG. 3 illustrates subscriber unit 20 in further detail. A television tuner 76 receives the signals transmitted on cable television network 16. Subscriber unit 20 functions both as a coupon generator and as a "converter box" of the type commonly used by subscribers to cable television services. For example, television tuner 76 heterodynes all channels to a specific frequency band, such as that corresponding to channel 3 or 4. The internal tuner of television 18 can then be set to the that channel to display the televised programming. An amplitude modulation detector 78 receives the tuned channel signal 80 and detects the video signal 82. A closed-captioning decoder 84 receives video signal 82 and extracts any closed-captioning data 86, as described above with respect to closed-captioning readers 52–58 in FIG. 2. Closed-captioning decoder 80 also converts closed-captioning data 86 to a video signal and combines it with a portion of video signal 82 in the manner commonly used in closed-captioning circuits. An amplitude modulator 88 re-modulates a carrier corresponding to channel 3 or 4 with the captioned video 90. The output signal 92 may be provided to television 18. A controller 94, which includes a suitable microprocessor or microcontroller operating under suitable software, provides a channel-select signal 96 to television tuner 76. Controller 94 receives suitable viewer control signals 97, which may carried on an infraread beam, from remote control unit 22 to effect channel selections and other control functions of the type typically performed by cable television converter boxes.

Although subscriber unit 20 in the illustrated embodiment functions as a converter as well as a coupon generator, persons of skill in the art can readily produce other embodiments in which subscriber unit 20 provides a signal appropriate for television 18 if it is cable-ready or if otherwise desired to tune the television channels using the internal tuner of television 18.

A coupon processor 98 includes a suitable microprocessor or microcontroller operating under suitable software. Coupon processor 98 receives closed-captioning data 86 from closed-captioning decoder 84. In the same manner as described above with respect to computer 68 in FIG. 2, coupon processor 98 searches for a control code to determine whether the closed-captioning data 86 represents a coupon identifier. Alternatively, or in addition, coupon processor 98 may verify that it has found a coupon identifier by reading some or all of the next 17 words and comparing them to words defining the ASCII-encoded string "COUPON AVAILABLE." When it has found a coupon identifier, coupon processor 98 reads the coupon identification number. Coupon processor 98 stores successively received coupon identication numbers in a memory and provides the coupon identification number data 107 corresponding to the most recently received coupon identifier to a packet reader 108.

The caption "COUPON AVAILABLE" will be displayed on television 18 either because closed-captioning decoder 84 decoded it or, if television 18 does not receive output signal 92 but rather receives signals transmitted on cable distribution network 16 directly, because a closed-captioning decoder internal to television 18 decoded it.

A data tuner 100 also receives the signals transmitted on cable distribution network 16. As described above, a coupon packet is frequency modulated on a data channel. To increase the number of packets that may be transmitted simultaneously, multiple data channels may be used. If multiple data channels are used, coupon processor 98 may provide a channel select signal 101 to data tuner 100. Coupon processor 98 may, for example, select the data channel in response to the coupon identification number using a lookup table. A frequency modulation detector 102 receives the tuned data signal 104 and detects the packet data 106, which is a serial bit stream.

Packet reader 108 receives packet data 106 and converts the asynchronous bit stream to parallel synchronous data using suitable synchronization circuits and serial-to-parallel conversion circuits. Packet reader 108 determines the beginning of a packet in a suitable manner, such as by detecting sync bits that occur following the gap between packets. If packet reader 108 receives a coupon identification number from coupon processor 98, it compares the received coupon identification number to the data read from the coupon identification number field (bytes 1–6) of each incoming coupon packet. If it detects a match, packet reader 108 further reads the 256-bit demographic information field of the incoming packet. Packet reader 108 then directs header field data 110 representing the demographic information to coupon processor 98.

Coupon processor 98 receives the 256 bits of header field data 110 representing the demographic information and compares it to 256 bits received from a demographic switch 120. Demographic switch 120 is preferably a ROM. The switch settings or values of the individual bits provide information about the site at which subscriber unit 20 is installed and the consumers likely to be located there. The information may include whether the site is a home or business, the number of persons at that site, their ages and sexes, their consumption habits and the classes of products in which they would likely be interested. The bits may be organized into any suitable groupings. If coupon processor 98 detects a match, it provides a display signal 122 to a display 124. Like the caption "COUPON AVAILABLE" that is displayed on television 18, display 124 notifies the television viewer a coupon is available. If no match is detected display 124 remains blank or otherwise in its current state.

A television viewer who sees the caption "COUPON AVAILABLE" or who sees the notification provided by display 124 may press one or more buttons on remote control unit 22 to request that a coupon be generated. In response to this request, controller 94 provides a suitable request signal 126 to coupon processor 98. A special button may be provided on remote control unit 22 for this purpose or a predetermined sequence of buttons that would not normally be used for control of television 18 may be used.

In response to request signal 126, coupon processor 98 again provides the coupon identification number data 107 to packet reader 108. In the manner described above, packet reader 108 again searches the incoming packet data 106 for a packet having that coupon identification number. If it detects a match, packet reader 108 reads the image length field and the image bit field of the packet. It then directs the image length field data 112 to an address counter 114 and directs the image bit field data 116 to an image memory 118. Address counter 114 uses the image length to provide image memory 118 with the successive addresses to which the incoming image bit field data 116 is written. If packet reader 108 does not detect a match after approximately ten to fifteen seconds of searching successive incoming packets, it times out and abandons the search. Packet reader 108 will not find a packet having a matching coupon identification number if, for example, the television viewer waited a period of time exceeding the availability window before requesting a coupon.

In addition, if packet reader 108 detects a match in the coupon identification number field it transfers the header field data 110 in the next four header fields of the incoming packet to coupon processor 98. Coupon processor 98 converts this informationt into image format and then transfers it to image memory 118 as follows: Coupon processor 98 converts the ASCII-encoded universal product code (UPC) obtained from the packet header to a bar-code image format and writes the resulting additional image data 128 to an area of image memory 118 reserved for the UPC bar-code. Coupon processor 98 also converts the 256 bits received from demographic switch 120 to a bar-code image format and writes the resulting additional image data 128 to another area of image memory 118 reserved for the demographic bar-code. In addition, coupon processor 98 converts the ASCII-encoded date and time obtained from the packet header to an image format and writes the resulting additional image data 128 to still another area of image memory 118 reserved for the date and time that the advertisement was televised. Similarly, coupon processor 98 converts the ASCII-encoded cable company identification number to an image format and writes additional image data 128 to image memory 118. Image memory 118 thus stores an array of bits that, when printed, will produce a bit-mapped image of a coupon.

If coupon processor 98 does not receive header field data 110 from packet reader 108 within approximately ten to fifteen seconds after initiating the search, coupon processor 98 deletes the coupon identification number from its memory. A ten or fifteen second search period ensures that each packet corresponding to an available coupon will be transmitted at least two or three times, i.e., every five seconds, during the search period. This increases the probability that packet reader 108 will find the packet.

When coupon processor 98 has completed transferring the additional image information to image memory 118, coupon processor 98 provides a print signal 130 to a printer 132. Coupon processor 98 also deletes the coupon identification number from its memory. Printer 132 is preferably an economical thermal printer, but other types such as ink-jet printers, may also be suitable. Printer 132 has a roll of paper on which the coupon is printed. As the paper is advanced, the image is transferred in suitable groups from image memory 118 to printer 132 and printed. The resulting coupon will bear information identifying the product and the discount amount, the UPC bar-code, the demographic information bar-code, a date and time, and a cable company identification number. The television viewer can tear off the coupon when it has finished printing.

As mentioned above, coupon processor 98 may simultaneously store multiple coupon identification numbers in its memory. This will occur if the televised programming offers another coupon before the availability window for a previously offered coupon closes. As described above, packet reader 108 searches for a packet corresponding to a coupon identifier in response to the request initiated by the television viewer. Nevertheless, coupon processor 98 automatically periodically provides the stored coupon identifiers to packet reader 108 to initiate a packet search if no request signal 126 is received earlier. As described above, if no packet is found within approximately ten to fifteen seconds after it initiates a search, coupon processor 98 purges the corresponding coupon identification number from its memory. If a packet is found, coupon processor 98 will maintain the coupon identifier in its memory. Coupon processor 98 may initiate such a ten to fifteen second packet search as often as its operational speed allows, but preferably at least once a minute for each stored coupon identification number.

Display 124 is preferably a single-digit LED or LCD display that displays the number of coupon identification numbers that are currently stored in coupon processor 98 and thus represents the number of coupons currently available to the television viewer. A television viewer may select one of the available coupons using remote control unit 22 by entering a number on the keypad. For example, if display 124 displays the numeral "3" to indicate that three coupons are currently available, the television viewer may press the button labeled "1" to request that the third-to-last coupon offered be printed. (Another button may be pressed prior to the numeric button to notify controller 94 that the numeric button is request for a coupon rather than a request to change the television channel tuned.) Request signal 126 can provide processor 98 with this number, and processor 98 can use the number as an index to retrieve the corresponding coupon identification number from its memory. When coupon processor 98 deletes a coupon identification number from its memory, coupon processor 98 decrements the numeral displayed on display 124. The coupon availability window is preferably the same for all coupons offered over a given cable television system because the first coupon offered will always become unavailable first; a television viewer can thus more easily determine the coupon that corresponds to the numeral displayed on display 124.

Figure 4:
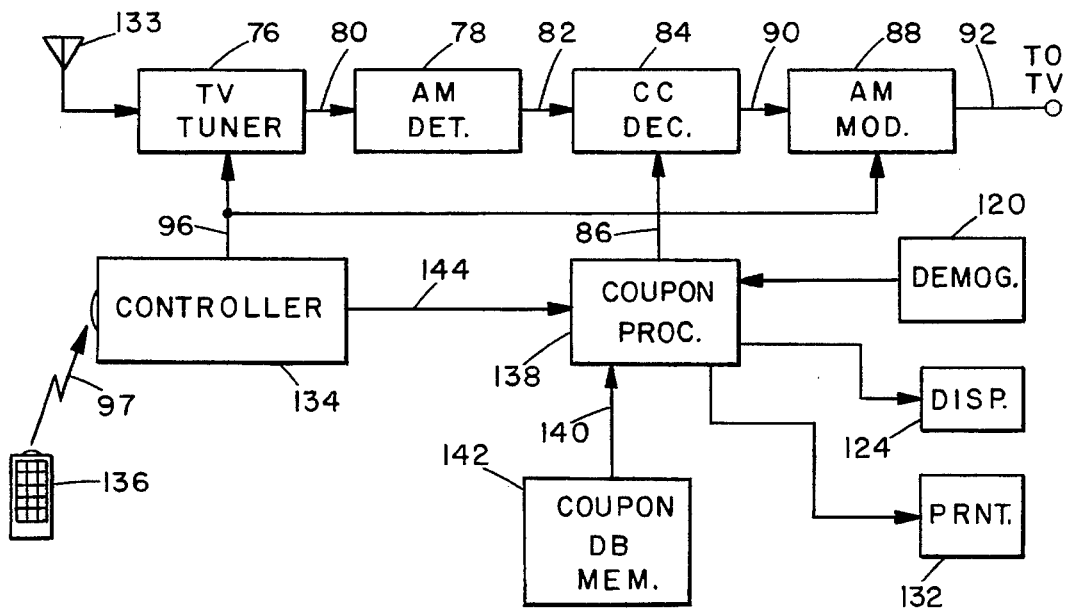
FIG. 4 is a diagrammatic view of an alternate embodiment of the receiving portion of the system at the television viewer's site.

FIG. 4 illustrates an embodiment of the present invention that may be particularly useful if no data channels are available. For example, it can be used to provide coupons to viewers of broadcast, i.e., radiated transmission, television if a cable television system is unavailable. In this embodiment, the portion of the present invention at the broadcasting station (not shown) operates in a manner similar to that of the cable television station described above with respect to FIG. 1, but it does not have a coupon subsystem 14.

Portions of this embodiment of the present invention operate in a manner identical to those described above with respect to FIGS. 1-3 and are therefore not described below in detail. To briefly summarize this operation, television tuner 76 receives the signals transmitted or broadcast over the air from an antenna 133. Amplitude modulation detector 78 receives tuned channel signal 80 and detects video signal 82. Closed-captioning decoder 84 receives video signal 82 and extracts any closed-captioning data 86. Closed-captioning decoder 80 also converts closed-captioning data 86 to a video signal and combines it with a portion of video signal 82 in the manner commonly used in closed-captioning circuits. Amplitude modulator 88 re-modulates a carrier of the same radio frequency (RF) as that tuned by tuner 76 with the captioned video 90. Output signal 92 may be provided to television 18. Controller 134 provides channel-select signal 96 to television tuner 76 and also to amplitude modulator 88, which generates the RF carrier in response. Controller 94 receives viewer control signals 97 from a remote control unit 136.

A coupon processor 138 includes a suitable microprocessor or microcontroller operating under suitable software. Coupon processor 138 receives closed-captioning data 86 from closed-captioning decoder 84. Coupon processor 138 searches closed-captioning data 86 for a control code and/or ASCII string "COUPON AVAILABLE" to determine whether a coupon identifier has been received. When it has found a coupon identifier, coupon processor 138 reads the coupon identification number. Coupon processor 138 stores successively received coupon identication numbers in a memory.

Coupon processor 138 uses the coupon identification number to form an address or pointer. Coupon processor 138 uses the pointer to read coupon information 140 from a coupon database memory 142. The coupon information is organized into multiple records, each corresponding to a coupon. The fields of coupon information in each record may include any of the information described above with respect to FIG. 2, such as an availability window, an ASCII-encoded universal product code (UPC) number, a demographic information field, a numeric image length in bytes, and an image field having the number of bits specified by the image length. The image field may define a bit-mapped image of the name of the advertised product and the amount of the discount, a graphical or pictorial representation of the product or the advertiser's logo, and any other information that the advertiser may wish to include. Alternatively, to minimize the amount of memory required, however, all coupon information may be ASCII-encoded, and no image field included.

Upon receiving a coupon identifier, coupon processor immediately retrieves only the coupon information in the demographic information field and the coupon availability window field. Coupon processor 138 compares the information in the demographic information field to that from a demographic switch 120. If coupon processor 138 detects a match, it provides a display signal 122 to a display 124 to notify the television viewer that a coupon is available. As described above with respect to FIG. 3, the numeral displayed on display 124 is an index corresponding to both the number of coupons currently available and the order in which they were received. If no match is detected, coupon processor 138 deletes the coupon identification number from its memory and does not alter display 124.

If a match is detected, coupon processor 138 also initiates an availability window timer that counts downward from a value equal to that in the coupon availability window field. When coupon processor 138 determines that a coupon availability window timer has reached zero, it deletes the coupon identification number from its memory and decrements the index numeral displayed on display 124.

A television viewer who sees the caption "COUPON AVAILABLE" on television 18 or who sees the notification provided by display 124 may press one or more buttons on remote control unit 136 to request that a coupon be generated. A television viewer may enter a number using remote control unit 136 to select one of the available coupons. In response to this request, controller 134 provides a suitable request signal 144 to coupon processor 138. Processor 138 uses the number as an index to retrieve the corresponding coupon identification number from its memory.

Also in response to request signal 144, coupon processor 138 uses the coupon identification number as an addressing index to retrieve the remaining fields of coupon information from coupon database memory 142. Coupon processor 138 then deletes the coupon identification number from its memory. Coupon processor 138 formats the retrieved coupon information and provides it to printer 132, which produces a coupon.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A method for generating a token, comprising the steps of:

providing video imagery having an embedded token identifier;

monitoring said video imagery to detect said embedded token identifier;

retrieving a token packet from a memory in response to detection of said embedded token identifier, said token packet corresponding to said embedded token identifier, said token packet including token information;

transmitting said video imagery over a first communication channel to a remote site for a first predetermined time period;

transmitting said token packet over a second communication channel to said remote site for a second predetermined time period, said second predetermined time period beginning at the same time as said first predetermined time period;

receiving said first communication channel at said remote site;

displaying said received video imagery at said remote site;

monitoring said first communication channel at said remote site to detect said embedded token identifier;

receiving said second communication channel at said remote site;

monitoring said second communication channel to detect said token packet corresponding to a detected embedded token identifier;

monitoring a user input device at said remote site to detect a user input during said second time period; and outputting said token information of a received token packet in response to a detected user input.

2. The method for generating a token claimed in claim 1, wherein said token information includes a bit-mapped image of said token.

3. The method for generating a token claimed in claim 1, wherein said second predetermined time period exceeds said first predetermined time period by no more than than five minutes.

4. The method for generating a token claimed in claim 1, wherein said step of outputting said token imagery comprises the step of printing said token imagery on paper.

5. The method for generating a token claimed in claim 1, wherein said token is a product coupon.

6. The method for generating a token claimed in claim 1, wherein said first and second communication channels are frequency bands on a cable.

7. The method for generating a token claimed in claim 1, wherein said user input device is a television remote control.

8. The method for generating a token claimed in claim 1, wherein said embedded token identifier is in the closed-captioning space of a video signal.

9. The method for generating a token claimed in claim 1, wherein said token packet is multiplexed on said second communication channel with other token packets.

10. A method for generating a token, comprising the steps of:

providing video imagery having an embedded token identifier;

transmitting said video imagery over a communication channel to a remote site for a first predetermined time period;

receiving said communication channel at said remote site;

monitoring received video imagery to detect said embedded token identifier;

retrieving a token packet from a memory in response to detection of said embedded token identifier, said token packet corresponding to said embedded token identifier, said token packet including token information;

displaying said received video imagery at said remote site;

monitoring a user input device at said remote site to detect a user input during a second predetermined time period exceeding said first predetermined time period by no more than five minutes; and outputting said token information of said retrieved token packet in response to a detected user input.

11. The method for generating a token claimed in claim 10, wherein said token information includes a bit-mapped image of said token.

12. The method for generating a token claimed in claim 10, wherein said step of outputting said token imagery comprises the step of printing said token imagery on paper.

13. The method for generating a token claimed in claim 10, wherein said token is a product coupon.

14. The method for generating a token claimed in claim 10, wherein said communication channel is a frequency band of radiated energy.

15. The method for generating a token claimed in claim 10, wherein said user input device is a television remote control.

16. The method for generating a token claimed in claim 10, wherein said embedded token identifier is in the closed-captioning space of a video signal.

17. A system for transmitting token information from a first location to a second location remote from said first location, said second location receiving video imagery transmitted from said first location, said video imagery having an embedded token identifier, said system comprising:

a data storage medium at said first location, said token information stored in said data storage medium;

a detector at said first location for monitoring said video imagery to detect said embedded token identifier;

a controller at said first location for retrieving a token packet from said data storage medium in response to detection of said embedded token identifier, said token packet corresponding to said embedded token identifier, said token packet including token information;

a data transmitter at said first location for transmitting said token packet to said second location via a first communication channel;

a receiver at said second location for receiving said first communication channel;

a detector for monitoring said video imagery at said second location to detect said embedded token identifier in said video imagery transmitted from said first location;

a user input device at said second location;

an output device at said second location; and a controller at said second location for reading a token packet and outputting a token having said token information via said output device in response to detection of an embedded token identifier and a user input signal.

18. The apparatus for generating a token claimed in claim 17, wherein said token information includes a bit-mapped image of said token.

19. The apparatus for generating a token claimed in claim 17, wherein said token is a product coupon.

20. The apparatus for generating a token claimed in claim 17, wherein said user input device is a television remote control.

21. The apparatus for generating a token claimed in claim 17, wherein said embedded token identifier is in the closed-captioning space of said video signal.

* * * * *